US009429282B2

(12) United States Patent
Fruhm (10) Patent No.: US 9,429,282 B2
(45) Date of Patent: Aug. 30, 2016

(54) APPARATUS AND SYSTEM FOR A ROTATING MOUNTING APPARATUS FOR STAGE DEVICES

(76) Inventor: Hermann Fruhm, Coquitlam (CA)

( * ) Notice: Subject to any disclaimer, the term of this patent is extended or adjusted under 35 U.S.C. 154(b) by 140 days.

(21) Appl. No.: 13/984,824

(22) PCT Filed: Feb. 10, 2012

(86) PCT No.: PCT/IB2012/050621
§ 371 (c)(1),
(2), (4) Date: Aug. 9, 2013

(87) PCT Pub. No.: WO2012/107910
PCT Pub. Date: Aug. 16, 2012

(65) Prior Publication Data
US 2013/0327913 A1    Dec. 12, 2013

Related U.S. Application Data

(60) Provisional application No. 61/441,755, filed on Feb. 11, 2011, provisional application No. 61/513,228, filed on Jul. 29, 2011.

(51) Int. Cl.
| | |
|---|---|
| *F21S 8/00* | (2006.01) |
| *F21S 2/00* | (2016.01) |
| *F21V 21/35* | (2006.01) |
| *A63J 1/00* | (2006.01) |
| *E04H 3/26* | (2006.01) |
| *F16M 11/08* | (2006.01) |
| *F16M 11/18* | (2006.01) |
| *F16M 11/42* | (2006.01) |
| *G03B 15/00* | (2006.01) |

(Continued)

(52) U.S. Cl.
CPC .. *F21S 2/00* (2013.01); *A63J 1/00* (2013.01); *E04H 3/26* (2013.01); *F16M 11/08* (2013.01); *F16M 11/18* (2013.01); *F16M 11/20* (2013.01); *F16M 11/42* (2013.01); *F16M 11/425* (2013.01); *F21V 21/35* (2013.01); *G03B 15/00* (2013.01); *F21W 2131/406* (2013.01)

(58) Field of Classification Search
CPC ........ A63G 7/00; A63G 31/16; A63G 11/00; A63J 1/00; F16M 11/08; F16M 11/42; F16M 11/20; F16M 11/425; F16M 11/18; F21W 2131/406; E04H 3/26; G03B 15/00; F21S 2/00; F21V 21/35
USPC ....... 248/349.1, 521, 522; 472/36, 60, 3, 42, 472/5; 362/286, 418
See application file for complete search history.

(56) References Cited

U.S. PATENT DOCUMENTS 2,895,770 A * 7/1959 Matthews ...................... 384/617
2,952,221 A * 9/1960 Hobel .............................. 104/41
(Continued)

FOREIGN PATENT DOCUMENTS

| EP | 1746333 A1 | 1/2007 |
|---|---|---|
| WO | WO 2005/043671 A1 | 5/2005 |

(Continued)

OTHER PUBLICATIONS

Notification of Transmittal of the International Search Report and the Written Opinion of the International Searching Authority, or the Declaration dated Jul. 11, 2012 in connection with International Patent Application No. PCT/IB2012/050621.

*Primary Examiner* — Anita M King (57) ABSTRACT

This disclosure provides an apparatus 100 and system 100 for a rotatable mounting of stage devices.

20 Claims, 11 Drawing Sheets (51) Int. Cl.
  *F16M 11/20* (2006.01)
  *F21W 131/406* (2006.01)

(56) References Cited

U.S. PATENT DOCUMENTS 4,025,777 A    5/1977  Hayakawa
4,699,484 A *  10/1987 Howell et al. ................ 352/243
6,769,790 B2   8/2004  Fruhm et al.
2002/0149940 A1* 10/2002 Fruhm et al. ................ 362/286
2007/0095341 A1*  5/2007 Kaneff ........................ 126/601

FOREIGN PATENT DOCUMENTS

WO    WO 2005/075885 A1    8/2005
WO        2010092412 A1    8/2010

* cited by examiner

APPARATUS AND SYSTEM FOR A ROTATING MOUNTING APPARATUS FOR STAGE DEVICES

CROSS-REFERENCE TO RELATED APPLICATION(S)

The present application claims priority under 35 U.S.C. §365 to International Patent Application No. PCT/IB2012/050621 filed Feb. 10, 2012. International Patent Application No. PCT/IB2012/050621 claims priority under 35 U.S.C. §365 and/or 35 U.S.C. §119(a) to U.S. Provisional Patent Application No. 61/441,755 filed Feb. 11, 2011 and U.S. Provisional Patent Application No. 61/513,228 filed Jul. 29, 2011 which are incorporated herein by reference into the present disclosure as if fully set forth herein.

TECHNICAL FIELD

This disclosure relates generally to support structures for stage devices. More specifically, this disclosure relates to an apparatus and system for a rotatable mounting of stage devices.

BACKGROUND

Stage devices are often mounted to a truss or other fixed support structure.

SUMMARY

This disclosure provides an apparatus and system for rotatable mounting of stage devices.

Other technical features may be readily apparent to one skilled in the art from the following figures, descriptions, and claims.

BRIEF DESCRIPTION OF THE DRAWINGS

For a more complete understanding of the present disclosure, and the advantages thereof, reference is now made to the following descriptions taken in conjunction with the accompanying drawings, wherein like numbers designate like objects, and in which:

FIG. 4 presents a detail view of an inner side of the apparatus 100 of FIG. 1;

DETAILED DESCRIPTION

The various embodiments used to describe the principles of the present invention in this patent document are by way of illustration only and should not be construed in any way to limit the scope of the invention. Those skilled in the art will understand that the principles of the invention may be implemented in any type of suitably arranged device or system.

Figure 1:
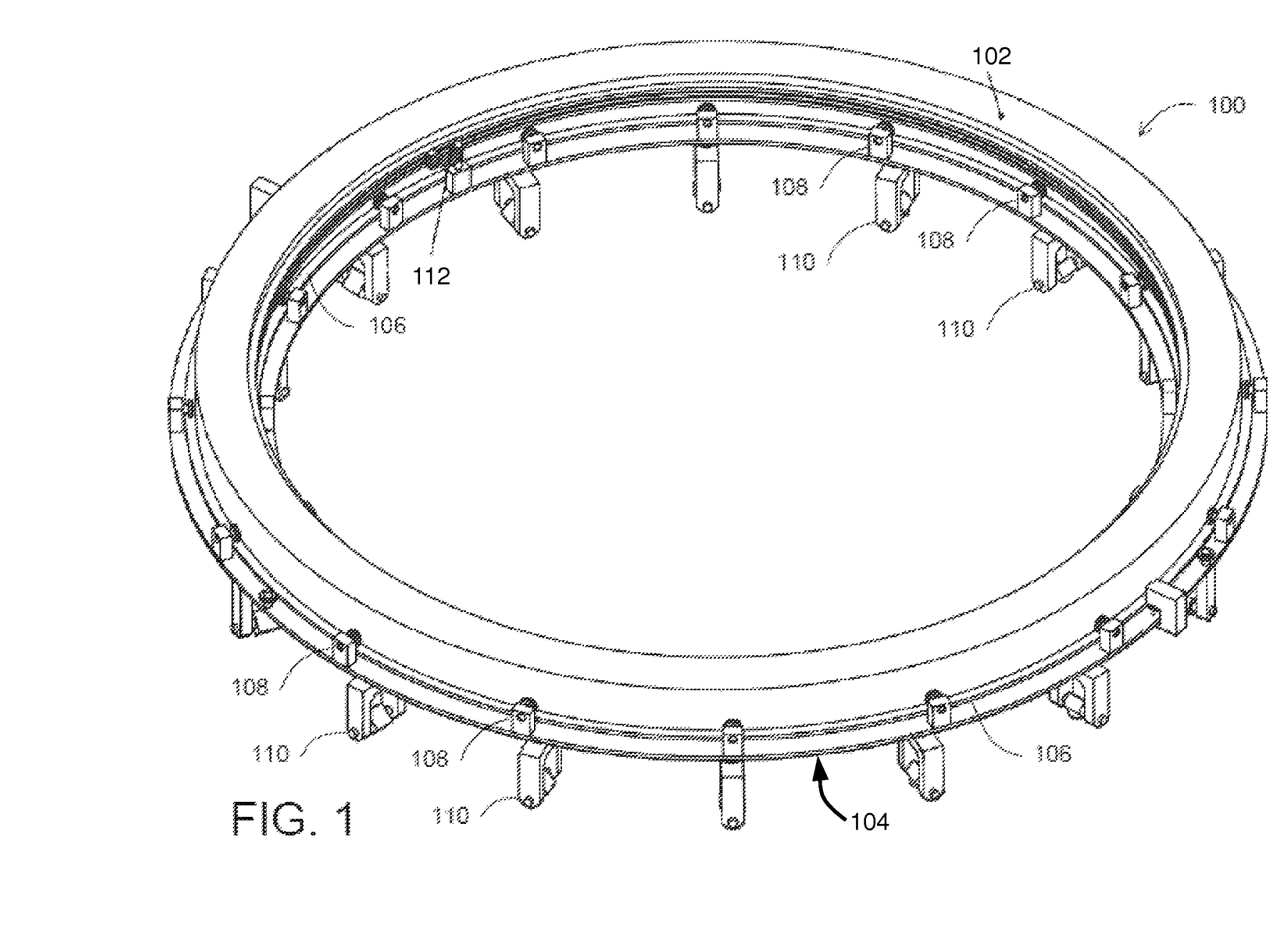
FIG. 1 presents an oblique view of an example apparatus according to this disclosure.

FIG. 1 presents an oblique view of an example apparatus 100 according to this disclosure. The embodiment of the apparatus 100 shown in FIG. 1 is for illustration only. Other embodiments of the apparatus 100 may be used without departing from the scope of this disclosure.

In this example embodiment, the apparatus 100 includes a circular truss (or support structure) 102 and a rotating base 104, suspended from the truss 102. As will be described in greater detail with reference to subsequent figures, the rotating base 104 is suspended by a coupling assembly comprising wheeled support mechanisms 108 from top sides of inner and outer portions 106 of peripheral portions of the truss 102. Mounted to the rotating base 104 are stage devices 110. As will be described in greater detail with reference to subsequent figures, the stage devices 110 receive electrical, power from an electrical power transfer mechanism 112 that includes conductor rails mounted to the truss 102 and current collectors mounted to the rotating base 104.

While shown in the figures oriented with the rotating base 104 below the truss 102, in other embodiments an apparatus according to the disclosure may be oriented with a rotating base above a truss or in any other orientation, as described in greater detail with reference to subsequent figures.

While the stage devices 110 shown in FIG. 1 are lighting fixtures, in other embodiments the stage devices 110 may include one or more video projectors, fog machines, bubble machines, confetti cannons, strobe lights, cameras, or other similar devices used in the presentation of an entertainment event or other event for which dynamic positioning of stage devices is desired.

Figure 2:
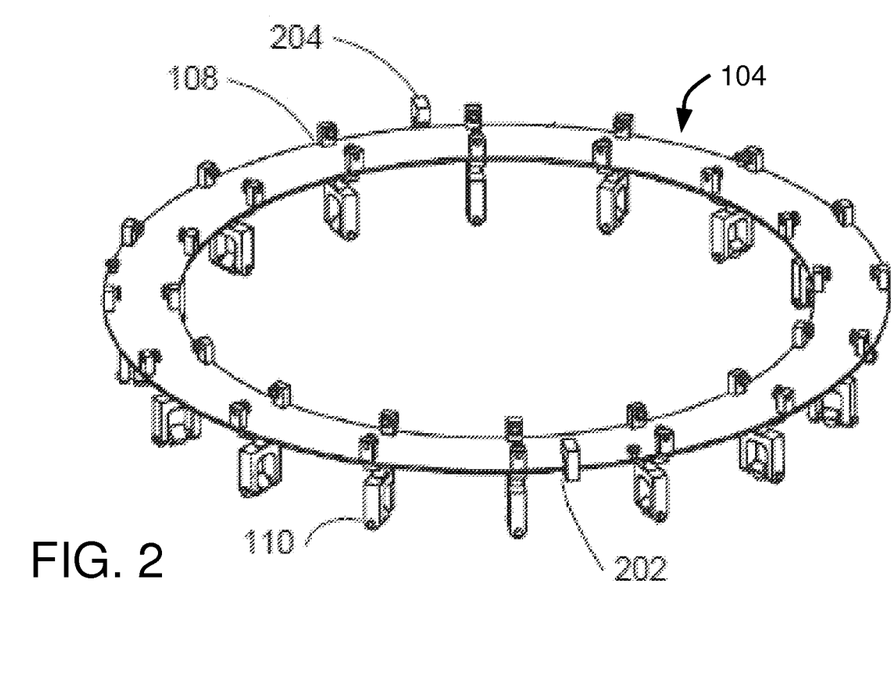
FIG. 2 presents an oblique view of the rotating base of FIG. 1.

FIG. 2 presents an oblique view of the rotating base 104 of FIG. 1. The wheeled support mechanisms 108 and stage devices 110 may be seen in FIG. 2. As will be described in greater detail with reference to subsequent figures, a drive mechanism 202 and a tensioning mechanism 204 are mounted to the rotating base 104. The drive mechanism 202 and the tensioning mechanism 204 bear against an outer side of the outer portion 106 of the truss 102 (or other surface of the truss 102) to maintain the rotating base 104 in a desired position relative to the truss 102 and to move the rotating base 104 relative to the truss 102.

While not shown in FIG. 2, an apparatus according to the disclosure may include a position sensing mechanism adapted to sense a position of the rotating base 104 relative to the truss 102. In some embodiments, the position sensing mechanism is adapted to enable the drive mechanism 202 to position the rotating base 104 at any desired position relative to the truss 102. In other embodiments, the position sensing mechanism is adapted to sense one or more reference positions (or 'home' positions) for the rotating base 104 relative to the truss 102.

While the drive mechanism 202 is shown mounted to the rotating base 104 in FIG. 2, in other embodiments the drive mechanism 202 may be mounted to the truss 102 and bear against a surface of the rotating base 104. In some such embodiments, the drive mechanism 202 includes a drive wheel in contact with an upper surface of the rotating base 104, creating a friction drive arrangement for the rotating base 104.

While the rotating base 104 is shown in this disclosure as a unitary structure, it will be understood that, other embodiments may comprise separate elements (such as circular segments) fixedly attached to each other. Still other embodiments may comprise a plurality of 'carts', individually suspended from the truss 102 and linked by chains, a bail-and-socket coupling, or other suitable coupling such that propulsive force is transferred from one cart to the next.

While the rotating base 104 is shown as a circular structure, it will be understood that other embodiments may comprise other shapes, where the wheeled support mechanisms 108, the drive mechanism 202, and the tensioning mechanism 204 are mounted to portions of the shape that remain adjacent to the truss 102 as the rotating base 104 moves. While the rotating base 104 is shown as a flat plate, it will be understood that other embodiments may comprise other shapes suitable for rotating around the truss 102 and mounting the stage devices 110, such as a curved U-channel or otherwise.

Figure 3:
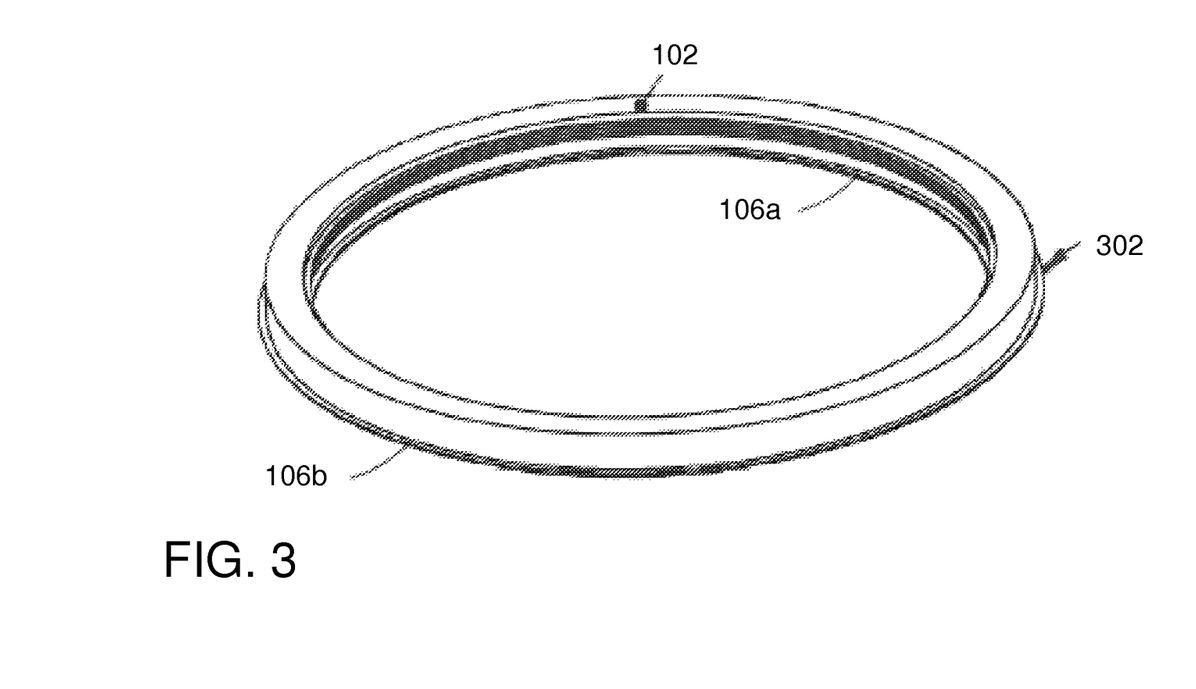
FIG. 3 presents an oblique view of the circular truss of FIG. 1.

FIG. 3 presents an oblique view of the circular truss 102 of FIG. 1. As shown in the embodiments of this disclosure, portion 106a and portion 106b (referred to herein, collectively, as portions 106) are formed by a circular track plate 302 that is mounted to a bottom surface of the truss 102. Portion 106a extends from an inner side of the circular truss 102. Portion 106b extends from an outer side of the circular truss 102.

In other embodiments, circular track plate 302 may be mounted on a support structure of another shape than the circular truss 102. Still other embodiments may include portions 106 that are separate structures welded to or otherwise mounted to inner and outer sides of the truss 102. In still other embodiments, portions 106 may include features produced during an extrusion or other fabrication step of the truss 102.

Figure 4:
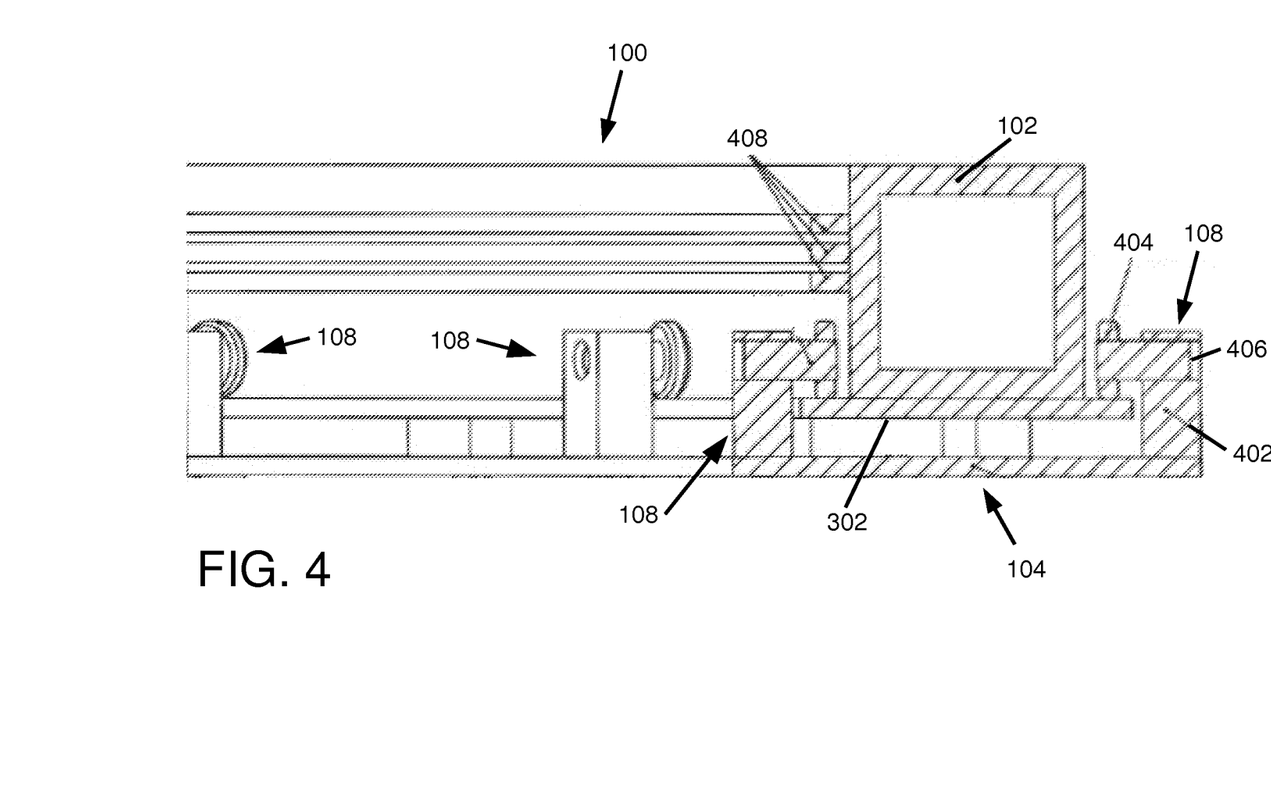
FIG. 4 presents a cross-sectional view of the apparatus of FIG. 1.

FIG. 4 presents a cross-sectional view of the apparatus 100 of FIG. 1. Various elements of the apparatus 100 previously discussed are visible in greater detail in FIG. 4. In particular, one of the wheeled support mechanisms 108 may be seen to comprise an extension (or support block) 402, mounted to the rotating base 104, and a weight bearing wheel 404, rotatably coupled to the extension 402 by an axle 406. The wheel 404 rolls on an upper surface of the track plate 302, which is mounted to a lower side of the circular truss 102 and extends from inner and outer sides of the truss 102.

The coupling assembly comprising the wheeled support mechanisms 108 thus constrains motion of the rotating base 104 in a radial direction relative to an axis of rotation of the rotating base 104, that is, motion of the rotating base 104 to the left and right, as shown in FIG. 4. While the extensions 402 will typically not contact the track plate 302, should the rotating plate 104 move far enough to the left or the right (i.e., in a radial direction), one of the extensions 402 will come into contact with the track plate 302 and prevent further motion of the rotating plate 104 in that direction.

Also visible in FIG. 4 are conductor rails 408, which comprise an element of the electrical power transfer mechanism 112 shown in FIG. 1.

Figure 5:
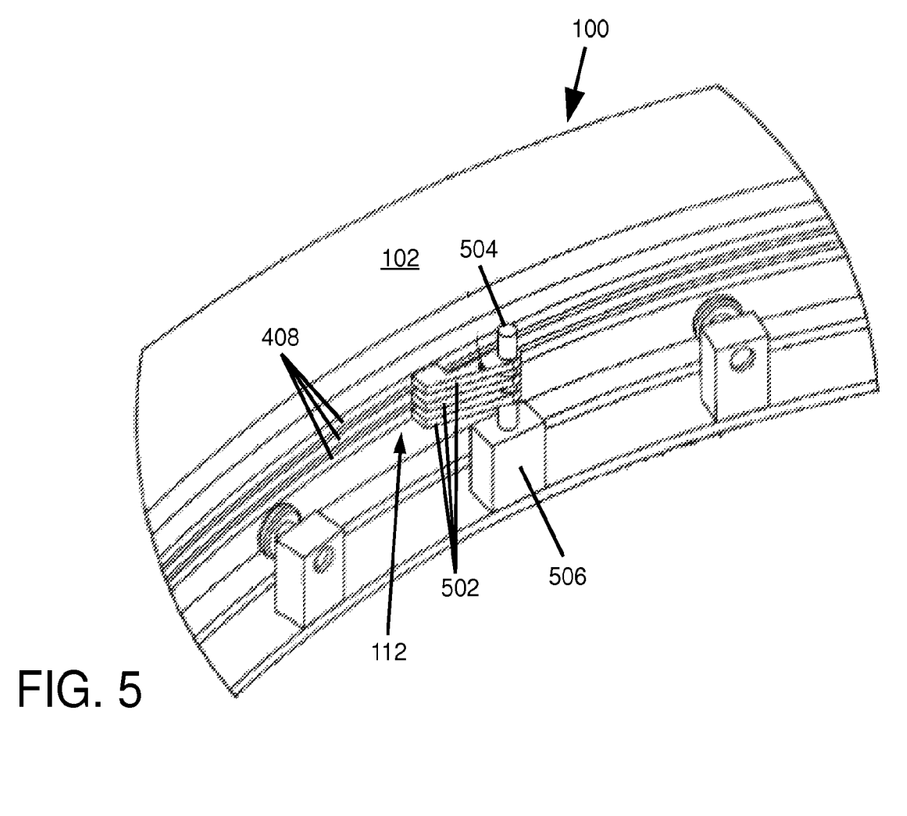

FIG. 5 presents a detail view of an inner side of the apparatus 100 of FIG. 1. Various elements of the apparatus previously discussed are visible in greater detail in FIG. 5. The electrical power transfer mechanism 112 includes the conductor rails 408 and current collectors 502. As was described with reference to FIG. 4, the conductor rails 408 are mounted to the inner side of the circular truss 102.

The current collectors 502 comprise wipers that are pivotally mounted to a support 504 and, via a junction box 506, to the rotating base 104. The current collectors 502 are spring loaded or otherwise biased to remain in substantially continuous contact with the conductor rails 408 as the rotating base 104 moves around the box truss 102. The surfaces of the wipers and the conductor rails that are in contact are electrically conductive and configured to transfer electrical power between the box truss 102 and the rotating base 104. Electrical conductors (not shown in FIG. 5) transfer electrical power collected by the current collectors 502 to the junction box 506. Electrical power is distributed from the junction box 506 to the stage devices 110 by a power distribution system described in greater detail with reference to subsequent figures.

In other embodiments, the conductor rails 408 may be mounted to another side of the circular truss 102 (or other support structure) and the current collectors 502 mounted in a corresponding po. In still other embodiments, as described in greater detail with reference to subsequent figures, the current collectors 502 may be mounted to the circular truss 102 and the conductor rails 408 mounted to the rotating base 104. In yet other embodiments, electrical power may be supplied to the rotating base 104 by means of a centrally located slip ring hub assembly.

While the mechanism 112 transfers electrical power from the static truss 102 to the moving rotating base 104, in other embodiments a similar mechanism may be used to transfer control signals between the static and moving portions of the system 100.

Figure 6:
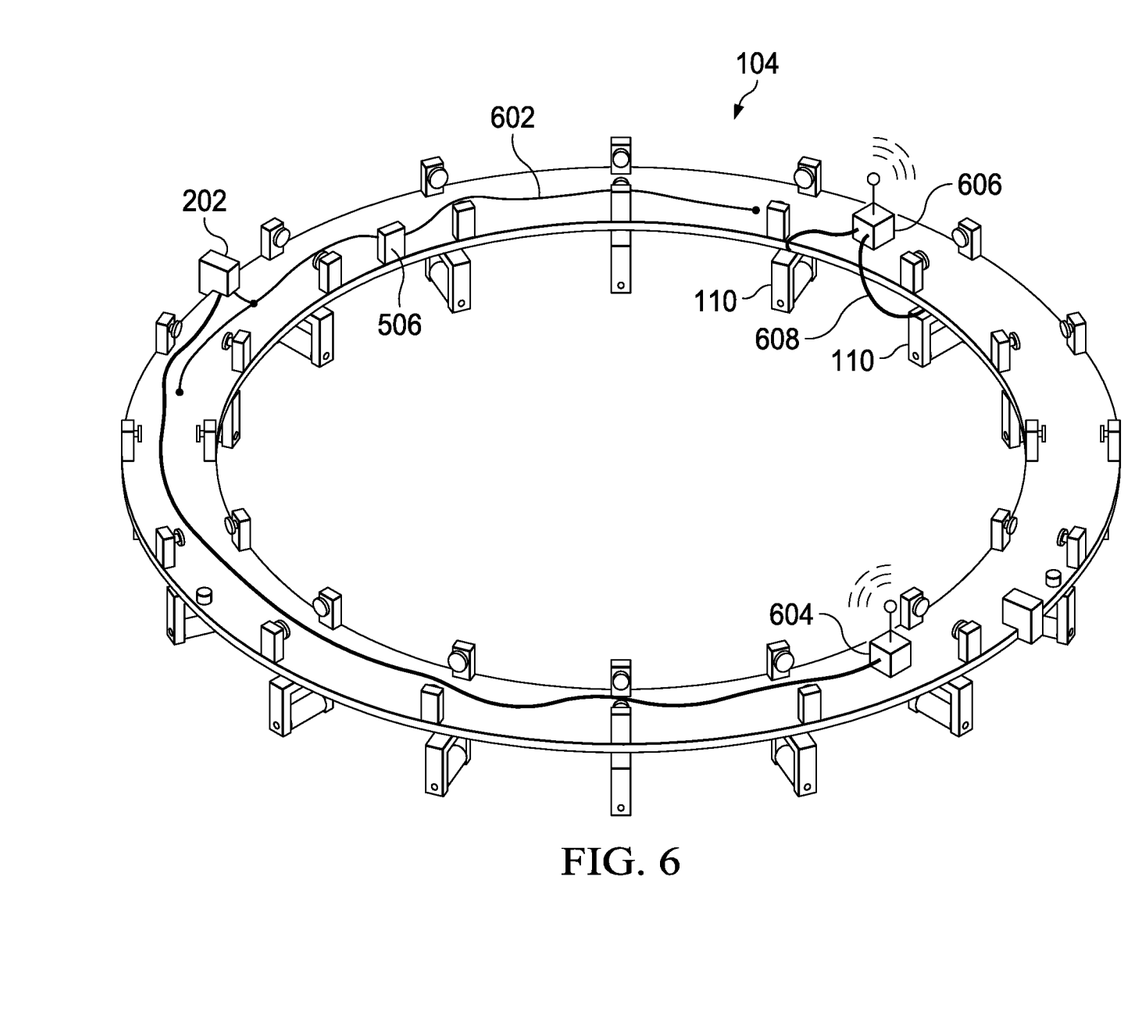
FIG. 6 presents an oblique view showing additional elements of the rotating base 104 of FIG. 1.

FIG. 6 presents an oblique view showing additional elements of the rotating base 104. The junction box 506 is electrically coupled to a power distribution system 602. While not shown in FIG. 6, the power distribution system 602 extends around substantially all of the rotating base 104, to provide electrical power to all elements of the rotating base 104.

In particular, the power distribution system 602 is electrically coupled to the drive mechanism 202. A wireless receiver 604 mounted to the rotating base 104 is communicatively coupled to the drive mechanism 202 and provides control signals thereto. As described with reference to FIG. 5 a system of one or more conductor bar/wiper pairs may be used in other embodiments to provides control signals to the drive mechanism 202.

A second wireless receiver 606 is mounted to the rotating base 104 to provide control signals to the stage devices 110. The wireless receiver 606 is coupled to the stage devices 110 by a data distribution system 608. While not shown in FIG. 6, the data distribution system 608 extends around substantially all of the rotating base 104, to provide control signals to all of the stage devices 110.

The wireless receiver 606 and data distribution system 608 are adapted to use the DMX512 communication protocol or other protocol suitable to control automated light fixtures and other stage devices 110. In some embodiments, a plurality of wireless receivers may be used to provide control signals to the stage devices 110. In other embodiments, one or more of the stage devices 110 may include wireless receivers and receive control signals directly.

Figure 7:
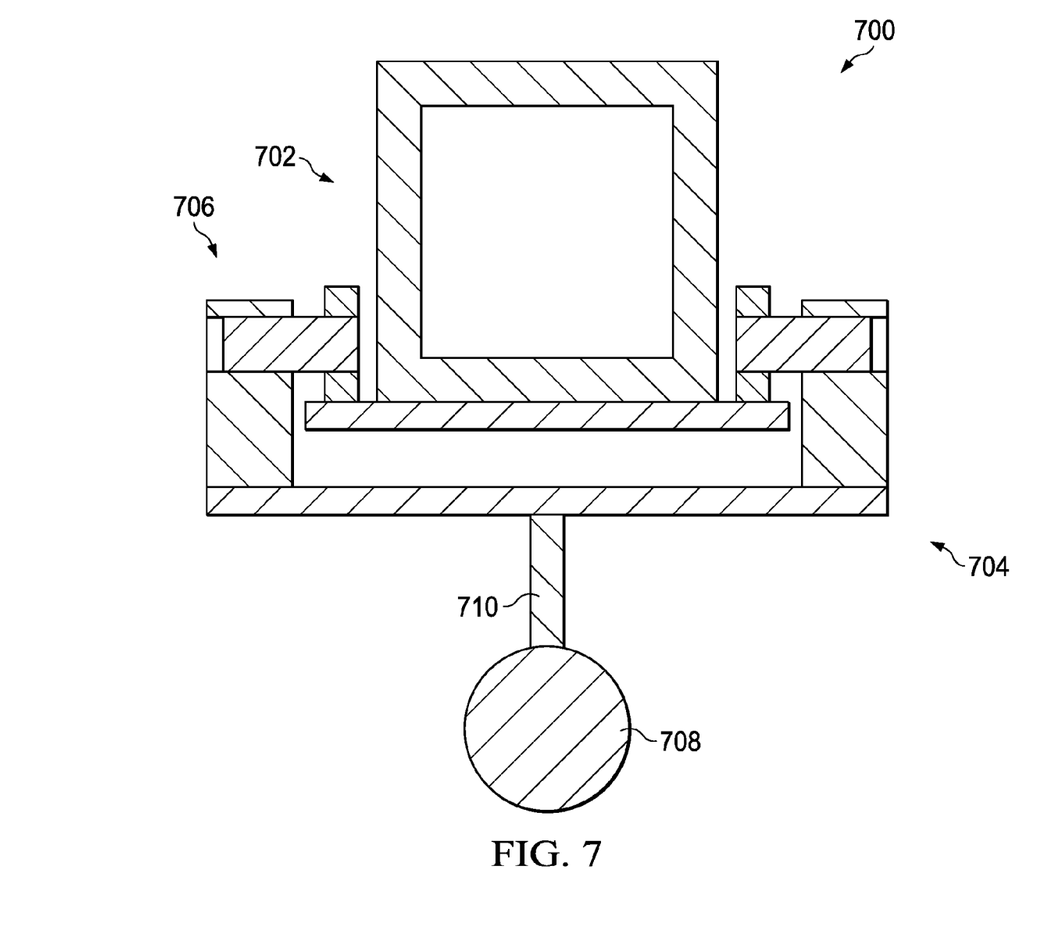
FIG. 7 presents a cross-section view of another example apparatus according to this disclosure.

FIG. 7 presents a cross-section view of another example apparatus 700 according to this disclosure. The apparatus 700 includes a support structure 702, a rotating base 704, and a coupling assembly 706, rotatably coupling the rotating base 704 to peripheral portions of the support structure 702.

The support structure 702, rotating base 704, and coupling assembly 706 of the apparatus 700 are similar to the like elements of the apparatus 100 described with reference to FIG. 4. The apparatus 700 further includes a mounting structure 708, comprising a circular pipe extending around a midline of the rotating base 704 and mounted to the rotating base 704 by a plurality of standoffs 710. The mounting structure 708 is configured to permit the permanent or temporary mounting of stage devices 110 to the rotating base 704.

Figure 8:
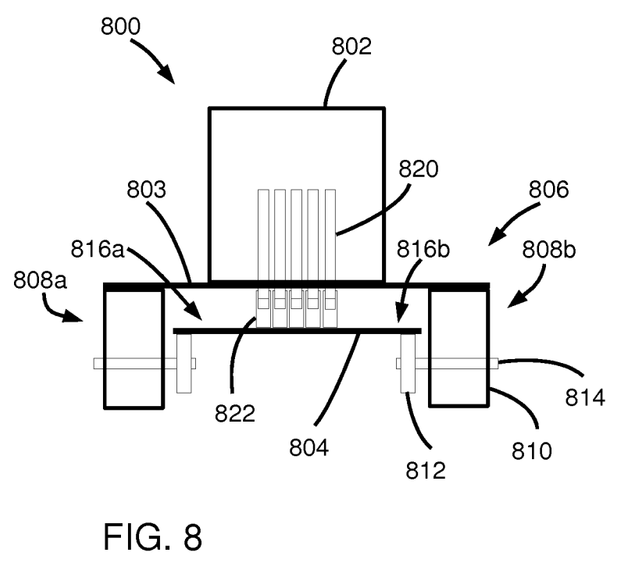
FIG. 8 presents a schematic cross-section view of another example apparatus according to this disclosure.

FIG. 8 presents a schematic cross-section view of another example apparatus 800 according to this disclosure. The apparatus 800 includes a support structure 802, a rotating base 804, and a coupling assembly 806, rotatably coupling the rotating base 804 to peripheral portions of the support structure 802.

The coupling assembly 806 includes a support plate 803 and wheeled support mechanisms 808a and 808b, and is configured to rotatably couple the rotating base 804 to the support structure 802. The wheeled support mechanism 808b include an extension 810, extending from the support structure 802 and a weight bearing wheel 812, rotatably coupled to the extension 810 by an axle 814. The wheeled support mechanism 806a is similarly configured. The wheels 812 of the wheeled support mechanisms 808a and 808b roll on portions 816a and 816b, respectively, of a lower surface of the rotating base 804. That is, the rotating base 804 is rotatably coupled to, and is supported by, the wheels 812.

As will be understood from other embodiments of the disclosure, a plurality of such wheeled support mechanisms 808 are mounted to the support structure 802 and support the rotating base 804 at a corresponding plurality of locations. In yet other embodiments, positions of the wheeled support mechanisms 808 may be staggered around inner and outer peripheral portions of the support structure 802, rather than being located on a common radial line, as shown in FIG. 8.

The extensions 810 of the wheeled support mechanisms 808 may extend past the bottom of the weight bearing wheels 812 to form 'feet' by which the apparatus 800 may be supported when placed on the ground or other surface. In other embodiments, the extensions 810 may be L-brackets, with one leg of the L-brackets coupled to the support plate 803 and the other leg extending from the support structure 802 to receive one or more axles 814.

The apparatus 800 further includes current collectors 820, mounted to the support structure 802, and conductor bars 822, mounted to a top side of the rotating base 804. The conductor bars 822 are in the shape of concentric rings that are also concentric with the rotating base 804. The current collectors 620 are biased toward the conductor bars 822 and remain in substantially continuous electrical contact with the conductor bars 822 as the rotating base 804 rotates.

In contrast to the embodiment described with reference to FIG. 5, in the apparatus 800 the conductor bars 822 move along with the rotating base 804 and the current collectors 820 remain stationary in the support structure 802, except for movement in the vertical direction to maintain electrical contact with the conductor bars 822.

A power source and/or controller may be coupled to the current collectors 820, which transfer power and/or control signals to the conductor bars 822. The conductor bars 822 may be electrically coupled to, and provide electrical power and/or control signals to, stage devices and other components of the apparatus 800 that are mounted to the rotating base 804.

While five pairs of current collectors 820 and conductor bars 822 are shown in FIG. 8, it will be understood that any suitable number of current collectors/conductor rails pairs of may be used in other embodiments.

Figure 9:
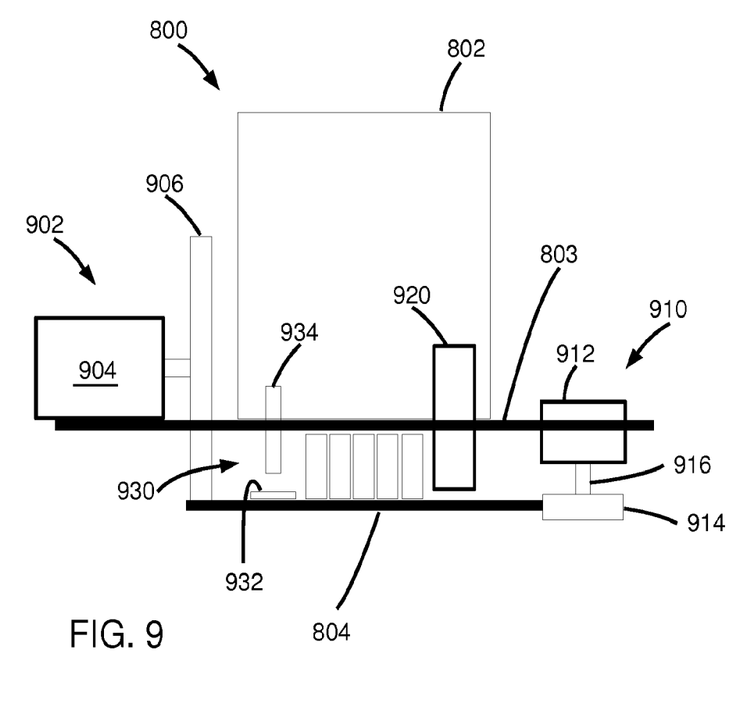
FIG. 9 presents a schematic cross-section view of another portion of the apparatus of FIG. 8.

FIG. 9 presents a schematic cross-section view of another portion of the apparatus 800 of FIG. 8. The apparatus 800 further includes a drive mechanism 902 mounted to the support structure 802 via the support plate 803. The drive mechanism 902 includes a motor 904 configured to rotate a drive wheel 906. The drive wheel 906 extends through the support plate 803 and contacts a top surface of the rotating base 804 to cause motion of the rotating base 804.

The wheeled support mechanisms 808, described with reference to FIG. 8, act in opposition to vertical forces applied to the rotating base 804 by the drive mechanism 902. The drive mechanism 902 may be biased toward the rotating plate 804 to create a desired friction or contact force between the drive wheel 906 and the top surface of the rotating plate 804. The drive wheel 906 acts as a friction drive to cause motion of the rotating base 804.

In other embodiments, the drive wheel 906 and top surface of the rotating plate 804 may form a rack-and-pinion drive. In still other embodiments, the drive mechanism 902 is a linear motor having a powered component coupled to the support plate 803 and a driven component coupled to the rotating plate 804.

The coupling assembly 806, described with reference to FIG. 8, further includes a positioning wheel assembly 910. The positioning wheel assembly 910 includes a support block 912 and a positioning wheel 914 rotatably coupled to the support block 912 by an axle 916. The support block 912 is coupled to the support structure 802 via the support plate 803. The positioning wheel assembly 910 is configured to constrain motion of the rotating base 804 in a radial direction relative to an axis of rotation of the rotating base 804. That is, the positioning wheel assembly 910 is configured to maintain the rotating base 804 in a desired position relative to the support structure 802 and the support plate 803, and maintain alignment of elements mounted on the rotating plate 804 with corresponding elements mounted on the support structure 802 or support plate 803.

While a single positioning wheel assembly 910 is shown in FIG. 9, it will be understood that the apparatus 800 may include any suitable number of positioning wheel assemblies 910, While the positioning wheel assembly 910 is shown in FIG. 9 contacting an outer side of the rotating base 804, in other embodiments positioning wheel assemblies 910 may be mounted additionally or alternatively to contact an inner side of the rotating base 804.

The drive mechanism further includes a brake mechanism 920 mounted to the support structure 802 and extending through the support plate 803 to act on the rotating base 804. The brake mechanism 920 is configured to slow (or prevent) motion of the rotating base relative to the supporting structure. The brake mechanism is configured to extend, when activated, and contact the rotating plate 804 to slow its motion by the application of friction. In other embodiments, the braking mechanism 920 may be configured to apply a magnetic force (or other suitable force) to the rotating base 804 to slow its motion.

The apparatus 800 may include a position sensing system 930, comprising a position-coding tape 932 mounted on the rotating plate and a position sensor 934 mounted to the support structure 802 via the support plate 803. The position sensor 934 is configured to sense the position-coding tape and therefrom determine a position of the rotating base 804 relative to the support structure 802.

The position-coding tape 932 includes position-coding symbols. In some embodiments, each position-coding symbol encodes an absolute position. In other embodiments, the position-coding symbols are simple marks whose passage by the sensor 934 indicates a relative direction of motion and/or velocity of the rotating plate 804. In such embodiments, a unique mark may be placed on the position-coding tape 932 or on another location on the rotating plate 804 and sensed by the position sensor 934, or by another sensor, to provide an index position (or known absolute angular position) of the rotating base 804.

The position sensor 934 is configured to read the position-coding tape 932 and determine an absolute angular position, a relative direction of motion, and/or an angular velocity of the rotating base 804. In other embodiments, a controller receiving signals from the position sensor 934 may be configured to determine an absolute angular position, a relative motion, and/or an angular velocity of the rotating base 804. While in apparatus 800 position-coding symbols are displayed on the position-coding tape 932, in other embodiments position-coding symbols may be painted or displayed by any other suitable method directly on any suitable surface of the rotating base 804.

The position-coding tape 932 forms a substantially continuous ring on the upper surface of the rotating base 804. In other embodiments, the position-coding tape 932 may be placed in separated locations on the rotating base 804. In still other embodiments, the position-coding tape 932 provides only one, or a few, index positions marking corresponding angular positions of the rotating base 804. In both such other embodiments, the position sensor 934 (and/or a controller communicatively coupled to the position sensor 934) may be configured to interpolate the angular position of the rotating base 804 between locations of the position-coding tape 932.

In yet other embodiments, the wheel 914 or the drive wheel 906 may be coupled to an optical encoder or other suitable rotation sensor, and angular position of the rotating base 804 determined based upon signals from the rotation sensor. In still other embodiments, the position coding tape 932 may be mounted on the support structure 802 or the support plate 803 and the position sensor 934 mounted on the rotating base 804.

While the drive mechanism 902, positioning wheel assembly 910, position sensor 934, and brake mechanism 920 are all shown in the single cross section view of FIG. 9, it will be understood that in other embodiments these elements may be mounted to the truss at different angular positions from each other. In some embodiments, more than one drive mechanism 902 may be used to cause rotation of the rotating base 804.

Figure 10:
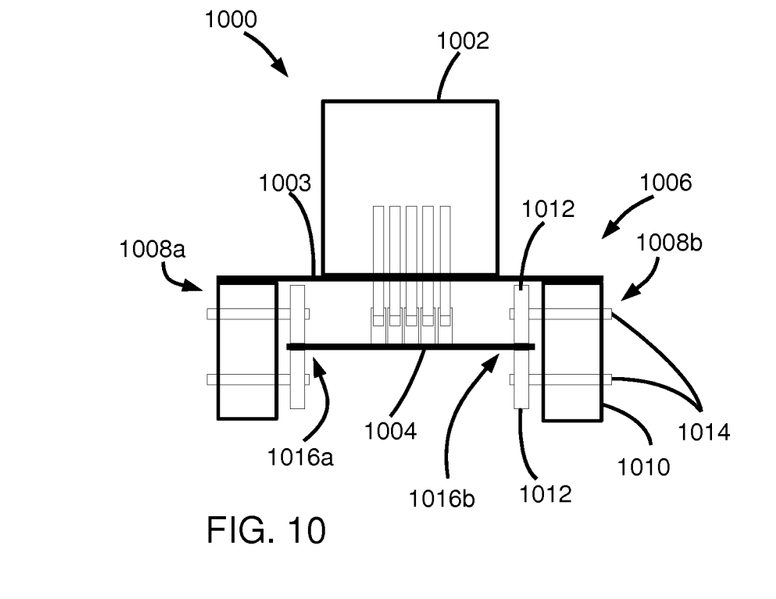
FIG. 10 presents a schematic cross-section view of another example apparatus according to this disclosure.

FIG. 10 presents a schematic cross-section view of another example apparatus 1000 according to this disclosure. The apparatus 1000 includes a support structure 1002, a rotating base 1004, and a coupling assembly 1006, rotatably coupling the rotating base 1004 to peripheral portions of the support structure 1002.

The coupling assembly 1006 includes a support plate 1003 and wheeled support mechanisms 1008a and 1008b, and is configured to rotatably couple the rotating base 1004 to the support structure 1002. The wheeled, support mechanism 1008b include an extension 1010, extending from the support structure 1002 and two weight bearing wheels 1012, rotatably coupled to the extension 1010 by two corresponding axles 1014. The wheeled support mechanism 1008a is similarly configured.

The wheels 1012 of the wheeled support mechanisms 1008a and 1008b roll on upper and lower surfaces of portions 1016a and 1016b, respectively, of the rotating base 1004. That is, the rotating base 1004 is rotatably coupled to, and is supported by, the wheels 1012. The coupling assembly 1006 is configured to support the rotating base 1004 against the force of gravity whether the apparatus 1000 is oriented as shown in FIG. 10 or is inverted, such that the rotating base 1004 is positioned above the support structure 1002.

Figure 11:
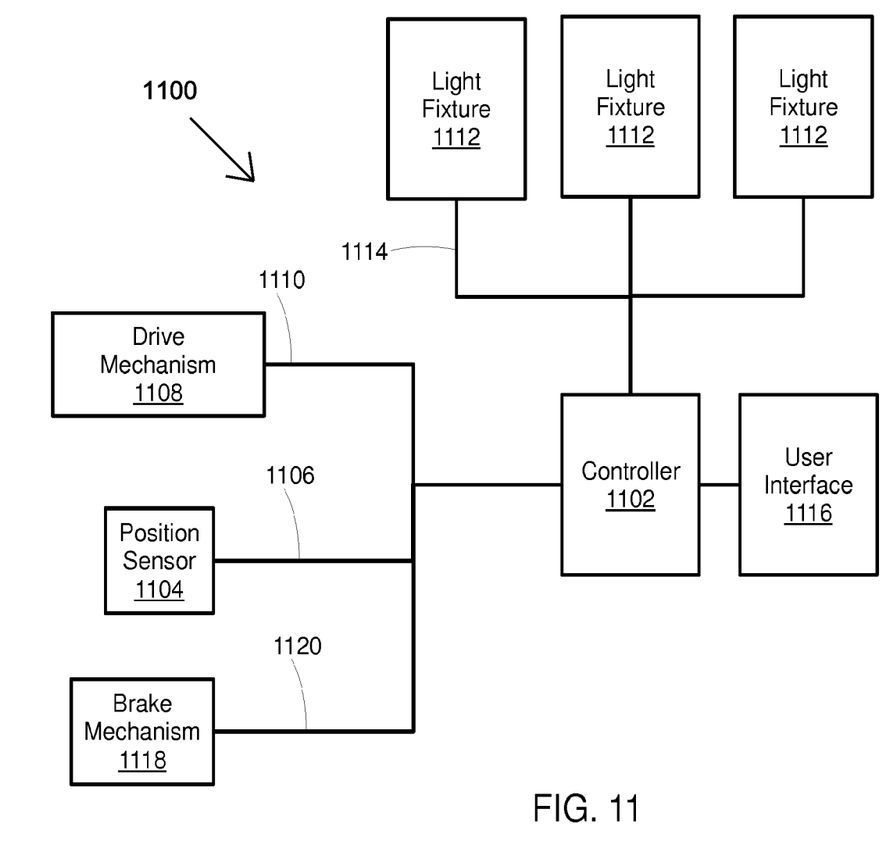
FIG. 11 depicts a control system according to this disclosure.

FIG. 11 depicts a control system 1100 according to this disclosure. The control system 1100 is described with reference to the apparatus 800 of FIGS. 8 and 9, but it will be understood that the control system may be used to control any rotating mounting apparatus for stage devices according to the disclosure.

A controller 1102 is communicatively coupled to a position sensor 1104 (such as position sensor 934) via a communication link 1106. The controller 1102 is configured to receive signals from the position sensor 1104 relating to absolute angular position, relative motion, and/or angular velocity of the rotating base 804. The position sensor 1104 may comprises a plurality of position sensors.

The controller 1102 is also communicatively coupled to a drive mechanism 1108 (such as drive mechanism 902) via a communication link 1110. The controller 1102 is configured to cause the drive mechanism 1108 to control rotation of the rotating base 804. The drive mechanism 1108 may comprise a plurality of drive mechanisms.

The controller 1102 is further communicatively coupled to a brake mechanism 1118 (such as brake mechanism 920) via a communication link 1120. The controller 1102 is configured to cause the brake mechanism 1118 to slow or prevent rotation of the rotating base 804. The brake mechanism 1118 may comprise a plurality of brake mechanisms.

In some embodiments, the controller 1102 is communicatively coupled to a plurality of lights 1112 mounted to the rotating plate, via one or more communication links 1114. The controller 1102 is configured to control characteristics of the light fixtures 1112, including pan, tilt, intensity, color, beam size, pattern, focus, and other controllable characteristics. The communication link 1114 may be a wired link, via current collectors and conductor sails, or may be a wireless link, via radio frequency signals or other suitable wireless communication technology.

The controller 1102 is communicatively coupled to user interface 1116. The controller 1102 is operable to receive input, from a user via the user interface 1116 to control operation of the apparatus 800 or other rotating mounting assembly according to this disclosure, as well as, in some embodiments, stage devices mounted to the rotating mounting assembly. The controller 1102 is also configured to signal to the user, via the user interface 1116, information relating to the operation of the apparatus 800, as well as, in some embodiments, stage devices attached thereto.

It may be advantageous to set forth definitions certain words and phrases used throughout this patent document. The term "couple" and its derivatives refer to any direct or indirect communication between two or more elements, whether or not those elements are in physical contact wish one another. The terms "application" and "program" refer to one or more computer programs, software components, sets of instructions, procedures, functions, objects, classes, instances, related data, or a portion thereof adapted for implementation in a suitable computer code (including source code, object code, or executable code). The terms "transmit," "receive," and "communicate," as well as derivatives thereof, encompass both direct and indirect communication. The terms "include" and "comprise," as well as derivatives thereof, mean inclusion without limitation. The term "obtain" and its derivatives refer to any acquisition of data or other tangible or intangible item, whether acquired from an external source or internally (such as through internal generation of the item). The term "or" is inclusive, meaning and/or. The phrases "associated with" and "associated therewith," as well, as derivatives thereof, may mean to include, be included within, interconnect with, contain, contained within, connect to or with, couple to or with, be communicable with, cooperate with, interleave, juxtapose, be proximate to, be bound to or with, have, have a property of, or the like. The term "controller" means any device, system, or part thereof that controls at least one operation. A controller may be implemented in hardware, firmware, software, or some combination of at least two of the same. The functionality associated with any particular controller may be centralized or distributed, whether locally or remotely.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. An apparatus comprising:
   a support structure;
   a rotating base having a center of rotation, the rotating base substantially surrounding the center of rotation;
   a drive mechanism coupled to a first one of the support structure and the rotating base and configured to cause motion of the rotating base relative to the support structure; and
   a coupling assembly, comprising a plurality of wheels configured to rotatably couple to a peripheral portion of one of the support structure and the rotating base and to support the rotating base,
   wherein the coupling assembly is configured to allow the rotating base to rotate relative to the support structure and to constrain motion of the rotating base in a radial direction relative to an axis of rotation of the rotating base.

2. The apparatus of claim 1, wherein:
   the support structure further comprises an inner side having a first portion extending from the inner side, and an outer side having a second portion extending from the outer side; and
   the coupling assembly is fixedly coupled to the rotating base and further comprises:
      a first extension, at least a first one of the plurality of wheels rotatably coupled to the first extension and configured to roll on the first portion of the support structure, and
      a second extension, at least a second one of the plurality of wheels rotatably coupled to the second extension and configured to roll on the second portion of the support structure,
      wherein the first and second extensions are configured to act on the first and second portions, respectively, of the support structure to constrain motion of the rotating base in the radial direction.

3. The apparatus of claim 1, wherein:
   the rotating base further comprises an inner portion and an outer portion; and
   the coupling assembly is fixedly coupled to the support structure and further comprises:
      a first extension, at least a first one of the plurality of wheels rotatably coupled to the first extension and configured to roll on the inner portion of the rotating base, and
      a second extension, at least a second one of the plurality of wheels rotatably coupled to the second extension and configured to roll on the outer portion of the rotating base,
      wherein the first and second extensions are configured to act on the inner and outer portions, respectively, of the rotating base to constrain motion of the rotating base in the radial direction.

4. The apparatus of claim 1, further comprising an electrical power transfer mechanism, comprising:
   a first power transfer device, coupled to the support structure; and
   a second power transfer device, coupled to the rotating base,
   wherein the second power transfer device is configured to receive power from the first power transfer device while moving relative to the first power transfer device.

5. The apparatus of claim 4, wherein the first power transfer device is a conductor bar and the second power transfer device is a current collector.

6. The apparatus of claim 5, wherein the rotating base further comprises a mounting structure configured to mount stage devices.

7. The apparatus of claim 6, wherein the rotating base further comprises a power distribution system configured to distribute electrical power from the second power transfer device to one or more stage devices mounted to the mounting structure.

8. The apparatus of claim 1, further comprising:
   one or more position indicia, coupled to a first one of the support structure and the rotating base; and
   a sensing device, coupled to the other one of the support structure and the rotating base,
   wherein the sensing device is configured to sense at least one position indicium and determine a position of the rotating base relative to the support structure.

9. The apparatus of claim 1, wherein the drive mechanism further comprises a brake mechanism configured to slow the motion of the rotating base relative to the supporting structure.

10. The apparatus of claim 1, wherein the drive mechanism further comprises:
    a motor coupled to the support structure; and
    a drive wheel coupled to the motor,
    wherein a portion of the drive wheel is in contact with the rotating base and the drive wheel is configured to cause motion of the rotating base.

11. A system, comprising:
    a rotating mounting apparatus configured to mount one or more stage devices; and
    a controller configured to control rotation of the rotating mounting assembly,
    wherein the rotating mounting apparatus comprises:
       a support structure;
       a rotating base having a center of rotation, the rotating base substantially surrounding the center of rotation and configured to mount the one or more stage devices;
       a drive mechanism coupled to a first one of the support structure and the rotating base and configured to cause motion of the rotating base relative to the support structure responsive to a control signal received from the controller; and a coupling assembly, comprising a plurality of wheels configured to rotatably couple to a peripheral portion of one of the support structure and the rotating base and to support the rotating base, wherein the coupling assembly is configured to allow the rotating base to rotate relative to the support structure and to constrain motion of the rotating base in a radial direction relative to an axis of rotation of the rotating base.

12. The system of claim 11, wherein the controller is further configured to send the control signal wirelessly to the drive mechanism.

13. The system of claim 11, wherein the controller is further configured to control operation of the one or more stage devices.

14. The system of claim 13, wherein the controller is further configured control operation of the one or more stage devices via a wireless communication link.

15. The system of claim 11, wherein the rotating mounting apparatus further comprises an electrical power transfer mechanism, the electrical power transfer mechanism comprising:

a first power transfer device, coupled to the support structure and configured to receive power from a power source; and a second power transfer device, coupled to the rotating base and configured to provide power to the one or more stage devices, wherein the second power transfer device is configured to receive power from the first power transfer device while moving relative to the first power transfer device.

16. The system of claim 15, wherein the rotating base further comprises a power distribution system configured to distribute electrical power from the second power transfer device to the one or more stage devices.

17. The system of claim 11, wherein the rotating base further comprises a mounting structure configured to mount the one or more stage devices.

18. The system of claim 11, further comprising:

one or more position indicia, coupled to a first one of the support structure and the rotating base; and a sensing device, coupled to the other one of the support structure and the rotating base, wherein the sensing device is configured to sense at least one position indicium and determine a position of the rotating base relative to the support structure, and the controller is further configured to receive a signal from the sensing device relating to the determined position of the rotating base.

19. The system of claim 18, wherein the drive mechanism further comprises:

a motor coupled to the support structure; and a drive wheel coupled to the motor, wherein a portion of the drive wheel is in contact with the rotating base and the drive wheel is configured to cause motion of the rotating base, and the controller is further configured to operate the motor responsive to the signal received from the sensing device.

20. The system of claim 19, wherein the drive mechanism further comprises a brake mechanism configured to slow the motion of the rotating base relative to the supporting structure, and the controller is further configured to operate the brake mechanism responsive to the signal received from the sensing device.

* * * * *